United States Patent
Steffens, Jr.

(10) Patent No.: US 6,457,743 B1
(45) Date of Patent: Oct. 1, 2002

(54) APPARATUS FOR USE WITH A STEERING WHEEL ASSEMBLY

(75) Inventor: Charles E. Steffens, Jr., Washington, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/543,005

(22) Filed: Apr. 4, 2000

(51) Int. Cl.$^7$ ................................................ B60R 21/16
(52) U.S. Cl. ...................... 280/731; 280/728.2; 74/552; 403/359.1
(58) Field of Search .............................. 280/731, 728.2; 74/552; 403/359.1, 359.5

(56) References Cited

U.S. PATENT DOCUMENTS

| | | | |
|---|---|---|---|
| 4,628,758 A | * 12/1986 | Yuzuriha et al. | ............... 74/498 |
| 5,172,607 A | * 12/1992 | Wu | ............... 74/552 |
| 5,816,113 A | 10/1998 | Fohl | |
| 5,823,024 A | 10/1998 | Goodson et al. | |
| 5,897,133 A | 4/1999 | Papandreou | |
| 5,941,131 A | 8/1999 | Fohl | |
| 6,033,145 A | * 3/2000 | Xu et al. | .................... 403/256 |
| 6,041,677 A | * 3/2000 | Reh et al. | ...................... 74/552 |
| 6,053,656 A | * 4/2000 | Heilig | .......................... 403/362 |

\* cited by examiner

*Primary Examiner*—Kenneth R. Rice
*Assistant Examiner*—Christopher Buchanan
(74) *Attorney, Agent, or Firm*—Tarolli, Sundheim, Covell, Tummino & Szabo L.L.P.

(57) ABSTRACT

An apparatus (10) for use in a vehicle comprises a steering shaft (12) rotatable about a first axis (B) and an activatable lock (18) operatively coupled with the steering shaft for preventing rotation of the steering shaft. The lock (18) is deactivated by a key (19). A vehicle steering wheel (20) includes a hub portion (130) and is non-rotatably connected to the steering shaft (12) by the hub portion for joint rotation with the steering shaft. The apparatus (10) further comprises an inflatable vehicle occupant protection device (70) attached to the steering wheel (20). A movable member (200) blocks axial movement of the steering wheel (20) relative to the steering shaft (12). A housing (160) encircles a portion of the steering shaft (12) and the hub portion (130). The housing (16) includes at least one opening (194). The movable member (200), upon rotation of the steering wheel (20) relative to the housing (16), moves from a first position in which the movable member is not aligned with the opening (194) to a second position in which the movable member is aligned with the opening to permit access to the movable member.

14 Claims, 5 Drawing Sheets

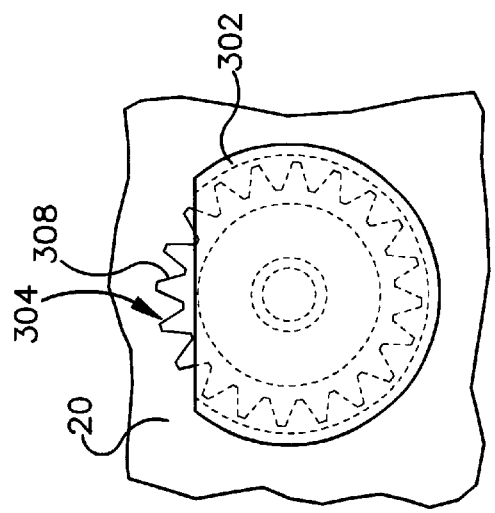
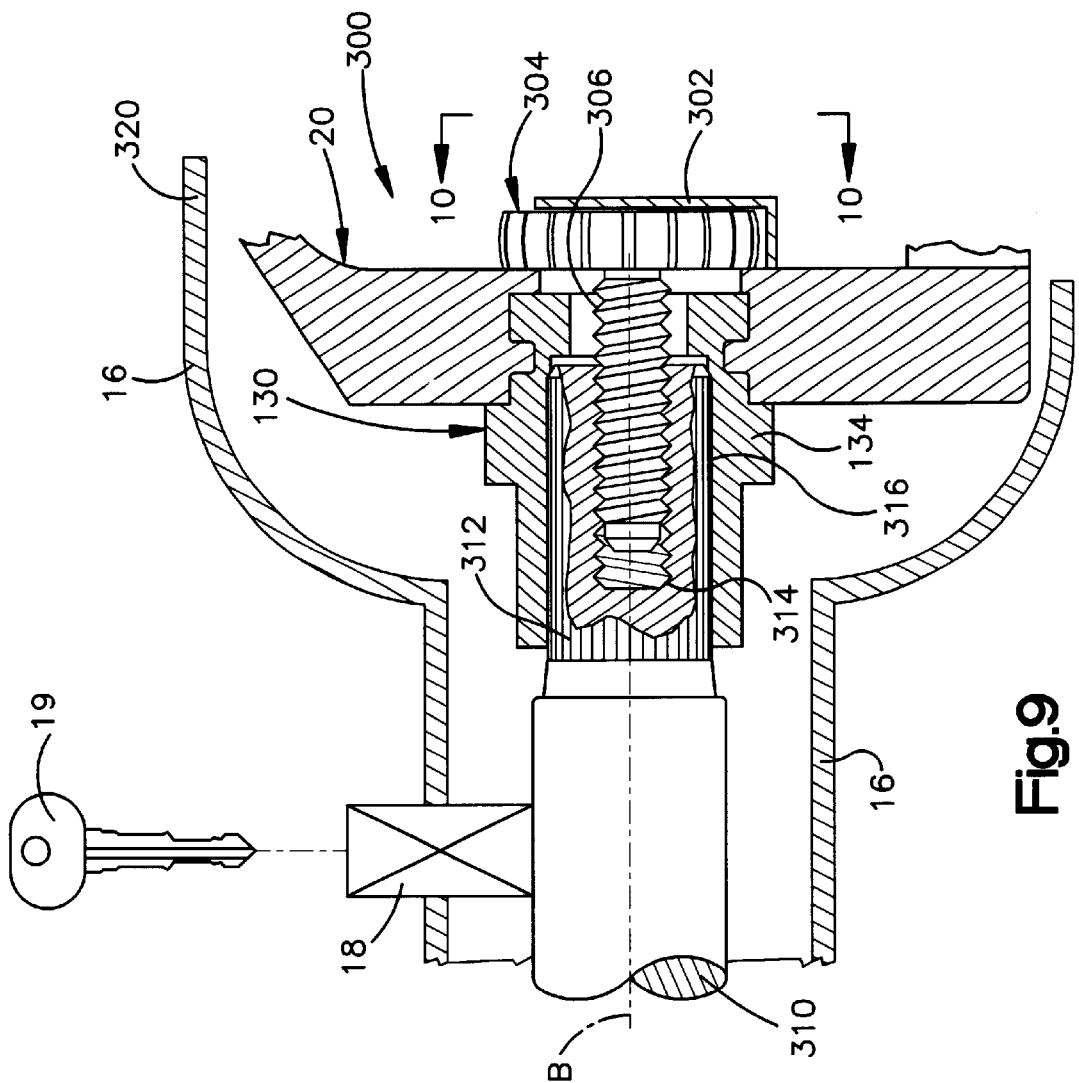

APPARATUS FOR USE WITH A STEERING WHEEL ASSEMBLY

TECHNICAL FIELD

The present invention relates to an apparatus for use with a steering wheel assembly. More particularly, the invention is directed to an apparatus for use in a vehicle having a steering wheel mounted on a rotatable steering shaft, an air bag module mounted on the steering wheel, and a lock for preventing rotation of the steering shaft and the steering wheel.

BACKGROUND OF THE INVENTION

As a means for deterring and preventing vehicle theft, most vehicles are equipped with a locking mechanism for preventing rotation of the vehicle steering shaft. The typical locking mechanism is deactivated when a vehicle-specific ignition key is inserted into a corresponding ignition keyhole arranged on the steering column and the key is subsequently turned. When the vehicle is parked (i.e., the vehicle ignition is turned OFF and the key is removed), it is typical for the steering wheel to be oriented such that the vehicle is pointed for travel in a generally straight line.

Most new vehicles are also equipped with a driver-side inflatable vehicle occupant protection device in the form of an air bag module mounted to the vehicle steering wheel to help protect the driver of the vehicle from injury in certain types of vehicle collisions. Because of the relatively high cost of an unactuated driver-side air bag module, theft of these steering wheel mounted air bag modules has become common.

Recently, so-called "integrated" steering wheel assemblies have been suggested in which a driver-side air bag module is incorporated into a steering wheel assembly prior to installation of the steering wheel assembly in the vehicle. As a result, theft of such an integrated air bag module involves theft of the entire integrated steering wheel assembly, which is more costly to replace than just an air bag module.

Accordingly, it is an object of the present invention to provide an apparatus for preventing the theft of an integrated steering wheel assembly having a driver-side air bag module incorporated in the assembly.

SUMMARY OF THE INVENTION

The present invention is an apparatus for use in a vehicle that uses a key to energize the vehicle's electrical system. The apparatus comprises a steering shaft rotatable about a first axis and an activatable lock operatively coupled with the steering shaft for preventing rotation of the steering shaft. The lock is deactivated by the key. A vehicle steering wheel assembly has a hub portion. The steering wheel assembly is non-rotatably connected to the steering shaft by the hub portion for joint rotation with the steering shaft. The apparatus further comprises an inflatable vehicle occupant protection device for helping to protect the driver of the vehicle in a vehicle collision. The inflatable vehicle occupant protection device is attached to the steering wheel. A movable member blocks axial movement of the steering wheel relative to the steering shaft. A housing encircles a portion of the steering shaft and the hub portion of the steering wheel. The housing includes at least one transversely extending opening. The movable member, upon rotation of the steering wheel relative to the housing, moves from a first position in which the movable member is not aligned with the opening to a second position in which the movable member is aligned with the opening to permit access to the movable member.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 9 is a schematic view, partly in section, of a vehicle steering assembly and a steering column constructed in accordance with a fourth embodiment of the present invention; and FIG. 10 is a sectional view taken along line 10—10 in FIG. 9.

DESCRIPTION OF PREFERRED EMBODIMENTS

Figure 1:
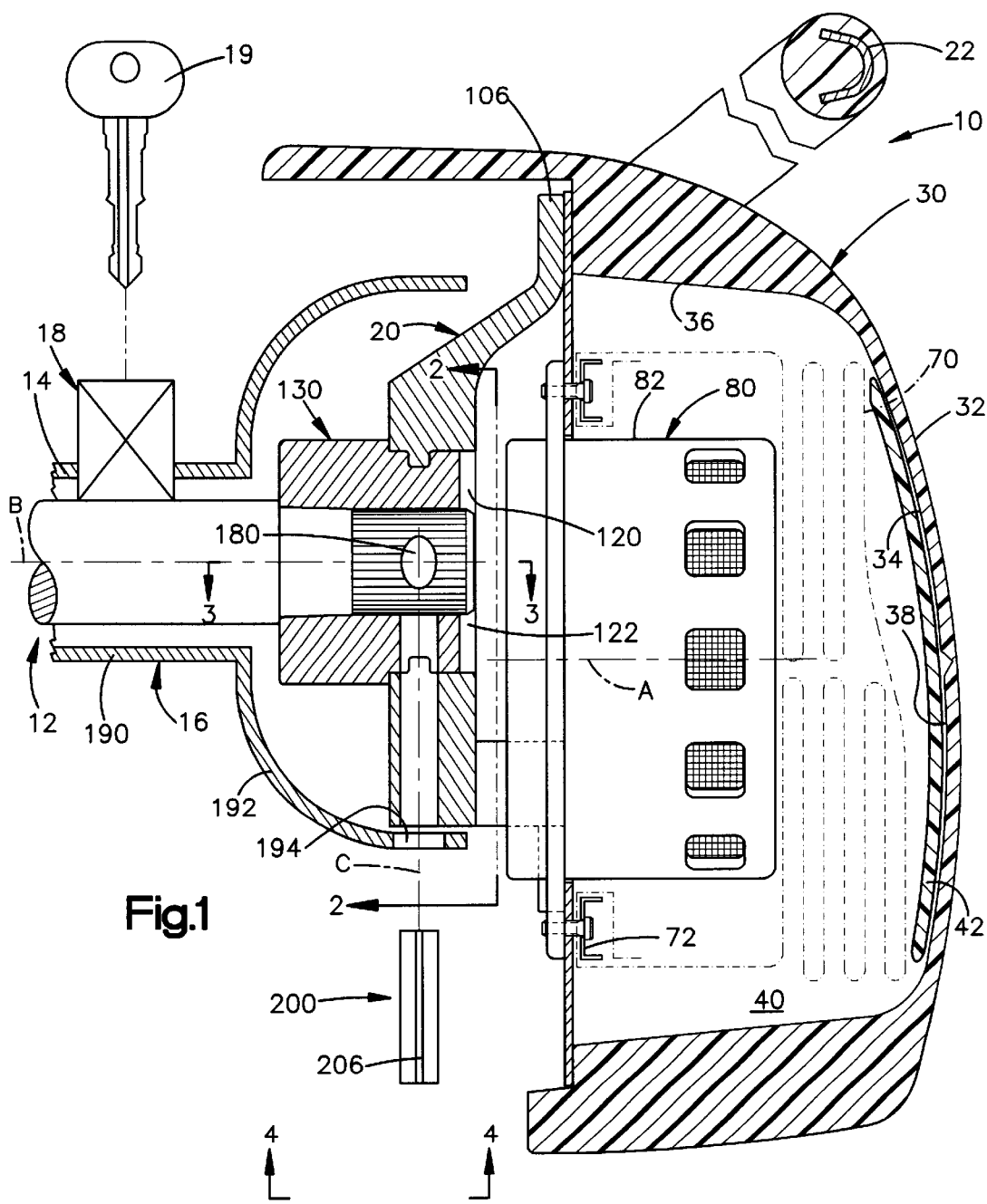
FIG. 1 is a schematic view, partly in section, of a vehicle steering assembly and a steering column constructed in accordance with a first embodiment of the present invention.

FIG. 1 illustrates a vehicle steering wheel assembly 10 and a vehicle steering column 12 constructed in accordance with the present invention. The steering wheel assembly 10 includes an armature 20. An non-removable cover 30 is attached to the armature 20. The cover 30 has a continuous outer surface 32, which extends uninterruptedly over a central area of the steering wheel assembly 10. An inner surface 34 of the cover 30 has a side wall portion 36 and an end wall portion 38. The inner surface 34 defines a cavity 40 in the central area of the cover 30. The cavity 40 may include a horn pad arrangement 42 and/or an occupant sensing device (not shown) such as a capacitive plate. In accordance with the illustrated embodiment of the invention, the cover 30 is made of a homogeneous urethane material.

The steering wheel assembly 10 includes an inflatable air bag 70 (shown schematically in FIG. 1) and an actuatable inflator 80 for, when actuated, inflating the air bag. The air bag 70 is located in the cavity 40 in the cover 30 between the inner surface 34 of the cover and the portion of the inflator 80 extending into the cavity. The inflator 80 is attached to the armature 20 in a known manner (not shown). A retaining ring 72 secures the air bag 70 to the inflator 80.

A metal hub 130 is partially located in an axial passage 122 through a base portion 104 of the armature 20. The hub 130 is an annular part that is centered on the axis B. The hub 130 is preferably cast into the armature 20 and is thus fixed to the armature. Alternatively, it should be understood that the hub 130 could be formed integrally with the armature 20 as a one-piece cast part.

Figure 3:
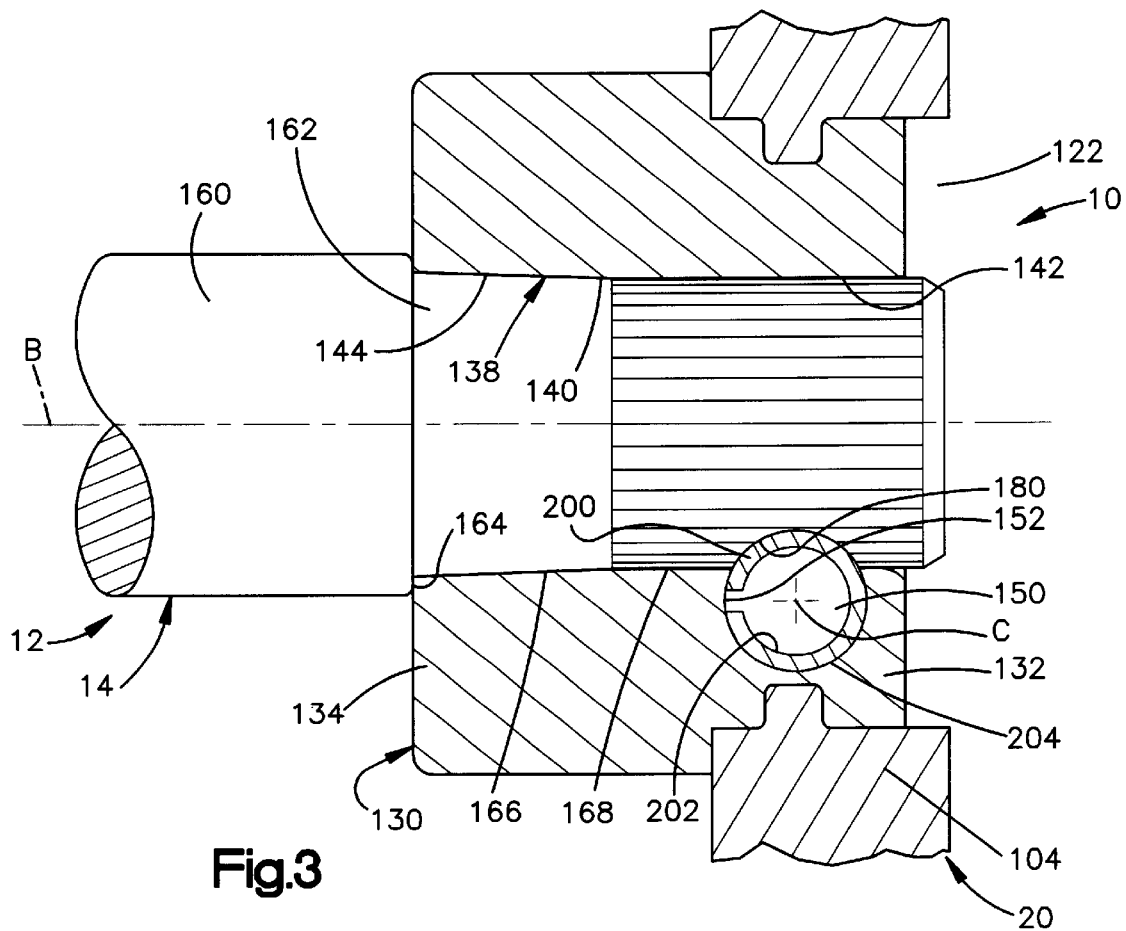
FIG. 3 is a sectional view taken along line 3—3 in FIG. 1.
Figure 4:
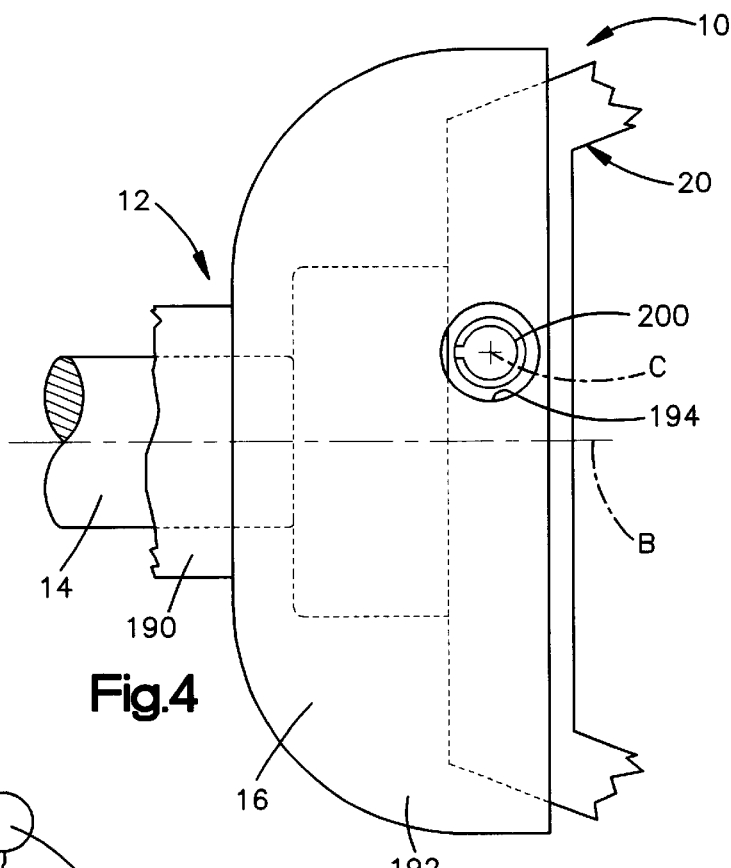
FIG. 4 is a view taken along line 4—4 in FIG. 1.

The hub 130 has first and second end portions 132 and 134, respectively (FIG. 3). The first end portion 132 is disposed within the passage 122 in the armature 20. The second end portion 134 extends axially beyond the base portion 104 of the armature 20.

An axially extending surface 138 defines a central passage 140 through the hub 130, which extends from the first end portion 132 to the second end portion 134. The passage 140 is centered on the axis B. The surface 138 has a first section 142 adjacent the first end portion 132 of the hub 130 and a second section 144 adjacent the second end portion 134 of the hub. The first section 142 of the surface 138 is splined, and the second section 144 of the surface 138 is smooth and tapered.

Figure 2:
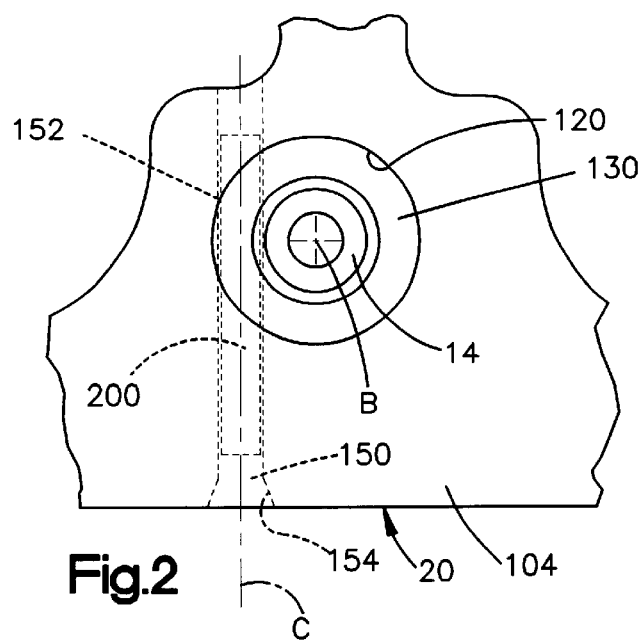
FIG. 2 is a view taken along line 2—2 in FIG. 1.

The base portion 104 of the armature 20 further includes a transversely extending aperture 150 (FIGS. 2 and 3) defined by a transversely extending surface 152. The surface 152 which extends through the base portion 104 of the support plate and through the hub 130 attached to the support plate. The aperture 150 is centered on an axis C, which is offset from the axis B. A portion of the transversely extending aperture 150 intersects the axially extending central passage 140 in the hub 130. The aperture 150 has a tapered end 154.

The steering column 12 includes a cylindrical steering shaft 14 centered on the axis B, which is the axis of rotation for the steering shaft. As shown in FIG. 3, the steering shaft 14 includes a main portion 160 and an upper end portion 162. The upper end portion 162 has a tapered surface 166 for mating with the tapered second section 144 of the surface 138 in the passage 140 through the hub 130. The upper end portion 162 further includes a splined surface 168 for meshing with the splined surface in the first section 142 of the surface 138 in the hub 130. An arcuate groove 180 (FIG. 1) is located in the upper end portion 162 of the steering shaft 14.

The steering column 12 includes a stationary housing 16 (FIG. 1) surrounding the upper end portion 162 of the steering shaft 14. The housing 16 has a cylindrical portion 190 and a cup portion 192. The cylindrical portion 190 encircles the upper end portion 162 of the steering shaft 14. The cup portion 192 surrounds the armature 30 and the hub 130. The cup portion 192 of the housing includes a transversely extending opening 194. The opening 194 is alignable with the aperture 150 in the base portion 104 of the armature 20 upon rotation of the steering wheel assembly 10 and the steering shaft 14 relative to the housing 16.

The steering column 12 further includes a known key-operated ignition locking mechanism, indicated schematically at 18 in FIG. 1. The locking mechanism 18 is operable to lock the steering shaft 14 and thereby prevent rotation of the steering shaft. The locking mechanism 18 is deactivated by the insertion and subsequent rotation of a vehicle-specific ignition key 19. Future "key" systems, such as an electronic smart key that may not require rotation of the key, are also envisioned.

A spring pin (or roll pin) 200 secures the steering wheel assembly 10 against axial movement relative to the steering shaft 14. The spring pin 200 is a hollow cylindrical member, which is preferably made of metal, but could be made of another material, such as a hard plastic. The spring pin 200 is centered on the axis C and includes parallel, cylindrical inner and outer surfaces 202 and 204, respectively (FIG. 3). The diameter of the outer surface 204 of the spring pin 200 is normally slightly larger than the diameter of the transversely extending aperture 150 in the base portion 104 of the support plate 100. The spring pin 200 further includes an axially extending slot 206 (FIG. 1), which extends throughout the entire length of the pin. The slot 206 provides the spring 200 pin with the ability to radially contract and expand as is known in the art.

To attach the steering wheel assembly 10 to the steering shaft 14, the hub 130 in the armature 20 is placed over the steering shaft such that the upper end portion 162 is received in the passage 140 through the hub. The splined section 142 of the surface 138 in the passage 140 meshes with the splined surface 168 of the steering shaft 14. The steering wheel assembly 10 is oriented so that the groove 180 in the splined surface 168 of the steering shaft 14 radially aligns with the transversely extending aperture 150 in the armature 20.

As the steering wheel assembly 10 is pushed onto the wheel shaft 14, the tapered surfaces 144 and 166 seat against one another. The end of the hub 130 also comes into contact with a radially extending surface 164 on the upper end portion 162 of the steering shaft 14 (FIG. 1). The groove 180 in the steering shaft 14 and the transversely extending aperture 150 now extend co-linearly along the axis C.

With the ignition key 19 inserted into the locking mechanism 18 and rotated so the locking mechanism is deactivated, the steering wheel assembly 10 and the steering shaft 14 are rotated relative to the housing 16 until the opening 194 in the housing aligns with the aperture 150 in the support plate 100. The alignment of the opening 194 and the aperture 150 preferably occurs when the steering wheel assembly 10 is rotated approximately 180°, placing the steering wheel assembly in an unusual orientation.

The spring pin 200 is then inserted through the opening 194 in the housing 16 and into the transversely extendingly aperture 150 through the tapered end 154 of the aperture in the armature 20. The tapered end 154 causes the spring pin 200 to contract radially as the pin is pushed into the aperture 150. Inside the aperture 150, the outer surface 204 of the spring pin 200 engages the surface 152 defining the aperture and the surface 182 defining the semi-circular groove 180 in the steering shaft 14. The spring pin 200 exerts a radially outwardly directed biasing force against the surfaces 152 and 182. The engagement of the spring pin 200 and the surfaces 152 and 182 of the aperture 150 and the groove 180, respectively, prevents axial movement of the steering wheel assembly 10 relative to the steering shaft 14.

The aforementioned structure and process for attaching the steering wheel assembly 10 to the steering shaft 14 requires the steering wheel assembly to be rotated in order for the opening 194 and the aperture 150 to be aligned and to provide access for the insertion of the roll pin 200. Accordingly, the vehicle's ignition key 19 must be in the locking mechanism 18 so that the locking mechanism is deactivated and the steering wheel assembly 10 can be rotated to the proper orientation. The apparatus described above thus prevents removal of the steering wheel assembly 10 without the ignition key 19, thereby helping to prevent theft of the steering wheel and air bag assembly.

Likewise, removal of the steering wheel assembly 10 requires that the ignition key 19 be inserted into the locking mechanism 18 and rotated so that the locking mechanism is deactivated. The steering wheel assembly 10 is then rotated to align the opening 194 and the aperture 150. When the opening 194 and the aperture 150 are aligned, spring pin 200 is removed from its position in the aperture 150 in the armature 20. This is accomplished by forcing a portion of the spring pin 200 out of the aperture 150 that it can be pulled from the aperture, as is known in the art.

Figures 5, 6:
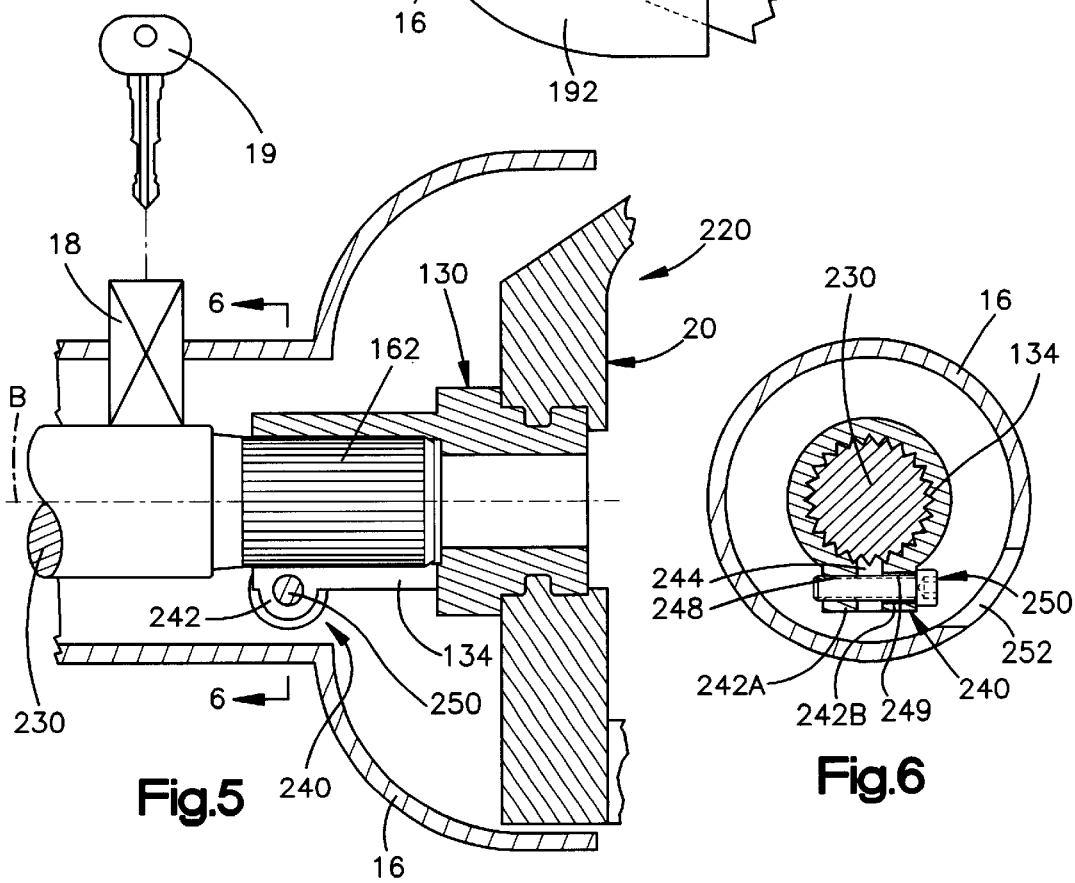
FIG. 5 is a schematic view, partly in section, of a vehicle steering assembly and a steering column constructed in accordance with a second embodiment of the present invention.
FIG. 6 is a sectional view taken along line 6—6 in FIG. 5.

FIGS. 5 and 6 illustrate a steering wheel assembly 220 and a steering shaft 230 constructed in accordance with a second embodiment of the present invention. In the second embodiment of FIGS. 5 and 6, reference numbers identical to those of the first embodiment of FIGS. 1–4 are used to designate parts that are identical to parts in the first embodiment.

According to the second embodiment, the second end portion 134 of the hub 130 includes a clamping sleeve 240. The clamping sleeve is formed by a pair of opposed flanges 242A and 242B that project radially outward from the second end portion 134. The flanges 242A and 242B are separated by a space 244. One of the flanges 242A has a threaded opening 248, and the other flange 242B has a clearance opening 249. The openings 248 and 249 extend along a common axis. A clamping screw 250 is received in the openings 248 and 249. When tightened, the screw 250 clamps the second end portion 134 of the hub 130 to the upper end portion 162 of the steering shaft 230.

An opening 252 (FIG. 6) is formed in the portion of the housing 16 surrounding the upper end portion 162 of the steering shaft 230 and the hub 130. In a similar fashion to the first embodiment, the opening 252 is alignable with the clamping screw 250 when the steering wheel assembly 220 is rotated to a predetermined orientation. As with the first embodiment, in order to install or remove the steering wheel assembly 220, the vehicle's ignition key 19 must be present in the locking mechanism 18 so that the steering wheel assembly can be rotated. Thus, the steering wheel assembly 220 and the steering shaft 230 according to the second embodiment help to prevent theft of the steering wheel assembly.

Figure 8:
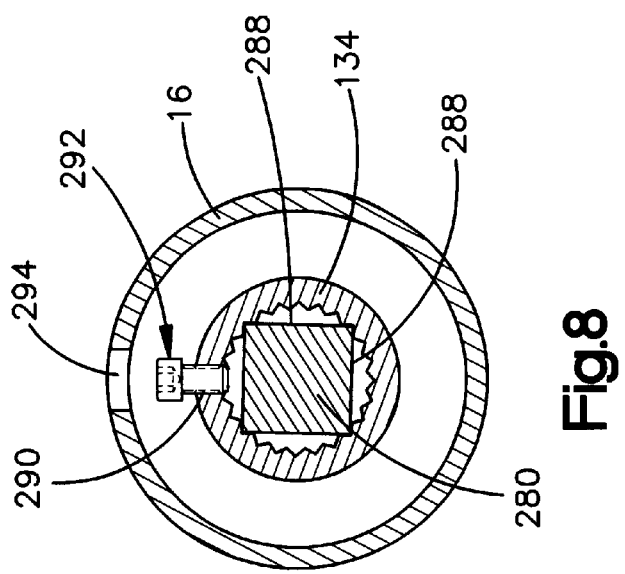
FIG. 8 is a sectional view taken along line 8—8 in FIG. 7.
Figure 7:
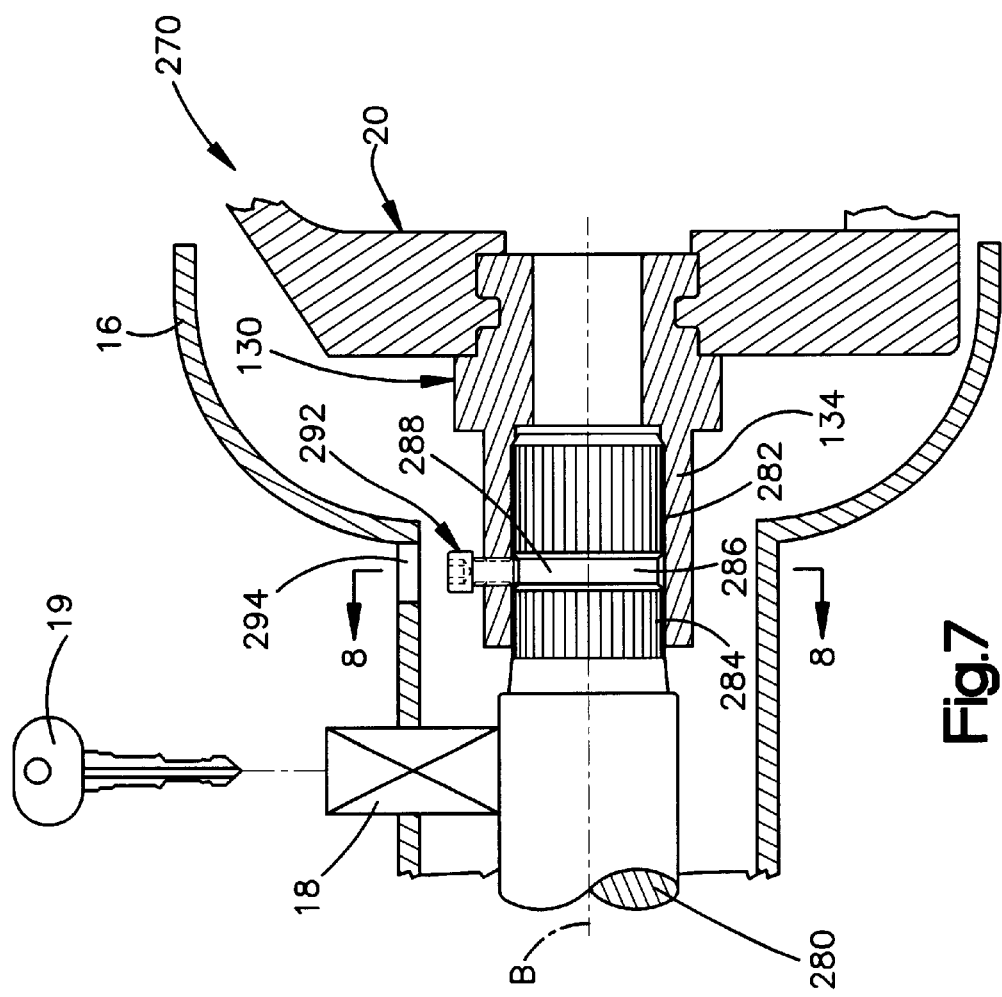
FIG. 7 is a schematic view, partly in section, of a vehicle steering assembly and a steering column constructed in accordance with a third embodiment of the present invention.

FIGS. 7 and 8 illustrate a steering wheel assembly 270 and a steering shaft 280 constructed in accordance with a third embodiment of the present invention. In the third embodiment of FIGS. 7 and 8, reference numbers identical to those of the first embodiment of FIGS. 1–4 are used to designate parts that are identical to parts in the first embodiment.

According to the third embodiment, an upper end portion 282 of the steering shaft 280 includes a first outer surface portion 284 having splines and a second outer surface portion 286 defined by a plurality of planar surfaces 288. The second outer surface portion 286 is positioned near the middle of the first outer surface portion 284.

The second end portion 134 of the hub 130 includes a threaded opening 290, which is aligned axially with the second outer surface portion 286 of the steering shaft 280. A setscrew 292 is received in the threaded opening 290 and, when tightened, clamps the second end portion 134 of the hub 130 against one of the planar surfaces 288 on the upper end portion 162 of the steering shaft 230.

An opening 294 is formed in the portion of the housing 16 surrounding the upper end portion 162 of the steering shaft 280 and the hub 130. In a similar fashion to the first and second embodiments, the opening 294 is alignable with the setscrew 292 when the steering wheel assembly 270 is rotated to a predetermined orientation. As with the first embodiment, in order to install or remove the steering wheel assembly 270, the vehicle's ignition key 19 must be present in the locking mechanism 18 to deactivate the locking mechanism so that the steering wheel assembly can be rotated. Thus, the steering wheel assembly 270 and the steering shaft 280 of the third embodiment help to prevent theft of the steering wheel assembly.

FIGS. 9 and 10 illustrate a steering wheel assembly 300 and a steering shaft 310 constructed in accordance with a fourth embodiment of the present invention. In the fourth embodiment of FIGS. 9 and 10, reference numbers identical to those of the first embodiment of FIGS. 1–4 are used to designate parts that are identical to parts in the first embodiment.

According to the fourth embodiment, an upper end portion 312 of the steering shaft 300 includes an internally threaded bore 314 and an outer surface portion 316.

A fastener cover 302 supports a fastener 304 on the hub 130. The fastener 304 has a screw-threaded stem 306 and a gear-driven head 308, and is rotatable about the axis B relative to the hub 130.

When the hub 130 is first received loosely over the steering shaft 310, a lower end portion of the fastener 304 guides the stem 306 into the screw-threaded bore 314 in the steering shaft 310. A gear tool (not shown) is then inserted through an opening 320 in the housing 16 and is used to rotate the head 308 of the fastener 304. The stem 306 is screwed into the bore 34, which draws the hub 130 downward over the steering shaft 310 to establish a press fit between the inner surface of the hub 130 and the outer surface 316 of the shaft.

In a similar fashion to the other embodiments, the opening 320 is alignable with the fastener 304 when the steering wheel assembly 300 is rotated to a predetermined orientation. Further, in order to install or remove the steering wheel assembly 300, the vehicle's ignition key 19 must be present in the locking mechanism 18 to deactivate so that the steering wheel assembly can be rotated. Thus, the steering wheel assembly 300 and the steering shaft 310 of the fourth embodiment help to prevent theft of the steering wheel assembly.

From the above description of the invention, those skilled in the art will perceive improvements, changes and modifications. It is contemplated that the invention described herein could be used with a so-called "drive-by-wire" system which does not have a steering shaft. Such improvements, changes and modifications within the skill of the art are intended to be covered by the appended claims.

Having described the invention, I claim:

1. An apparatus for use in a vehicle that uses a key to energize the vehicle's electrical system, said apparatus comprising:

a steering shaft rotatable about a first axis;

an activatable lock operatively coupled with said steering shaft for preventing rotation of said steering shaft, said lock being deactivated by the key;

a vehicle steering wheel including a hub portion, said steering wheel being non-rotatably connected to said steering shaft by said hub portion for joint rotation with said steering shaft;

an inflatable vehicle occupant protection device for helping to protect the driver of the vehicle in a vehicle collision, said inflatable vehicle occupant protection device being attached to said steering wheel;

a movable member for blocking axial movement of said steering wheel relative to said steering shaft; and a housing encircling a portion of said steering shaft and said hub portion of said steering wheel, said housing including at least one transversely extending opening;

said movable member, upon rotation of said steering wheel relative to said housing, moving from a first position in which said movable member is not aligned with said opening in said housing to a second position in which said movable member is aligned with said opening to permit access to said movable member.

2. The apparatus of claim 1 wherein said movable member comprises a roll pin having an axially extending slot for allowing said roll pin to expand and contract radially.

3. The apparatus of claim 1 wherein said steering wheel includes a base plate with a passage centered on a second axis, which extends transverse to said first axis, said passage receiving said movable member.

4. The apparatus of claim 1 wherein said steering shaft includes a groove centered on a second axis which extends transverse to said first axis, said movable member being partially disposed in said groove.

5. The apparatus of claim 1 wherein said steering shaft has a cylindrical outer surface with splines and said hub portion of said steering wheel has a cylindrical inner surface with splines which intermesh with said splines on said steering shaft to provide the non-rotatable connection of said steering wheel to said steering shaft.

6. The apparatus of claim 1 wherein said hub portion of said steering wheel includes a clamping sleeve.

7. The apparatus of claim 6 wherein said clamping sleeve includes a pair of oppositely disposed flanges separated by a space, said movable member comprising a clamping screw that extends through said pair of flanges to clamp said clamping sleeve about said steering shaft.

8. The apparatus of claim 6 wherein said clamping sleeve includes splines for engaging splines on said steering shaft.

9. The apparatus of claim 1 wherein said steering shaft includes a first outer surface portion having splines and a second outer surface portion defined by a plurality of planar surfaces.

10. The apparatus of claim 9 wherein said movable member comprises a setscrew which engages one of said plurality of planar surfaces.

11. A vehicle steering apparatus comprising:

a steering shaft rotatable about a first axis;

an activatable lock operatively coupled with said steering shaft for preventing rotation of said steering shaft;

a vehicle steering wheel including a hub portion, said steering wheel being non-rotatably connected to said steering shaft by said hub portion for joint rotation with said steering shaft;

a movable member for blocking axial movement of said steering wheel relative to said steering shaft; and a housing encircling a portion of said steering shaft and said hub portion of said steering wheel, said housing including at least one transversely extending opening;

said movable member, upon rotation of said steering wheel relative to said housing, moving from a first position in which said movable member is not aligned with said opening in said housing to a second position in which said movable member is aligned with said opening to permit access to said movable member.

12. The apparatus of claim 11 wherein said movable member comprises a roll pin having an axially extending slot for allowing said roll pin to expand and contract radially.

13. The apparatus of claim 11 wherein said movable member comprises a fastener with a gear arrangement for rotating said fastener.

14. The apparatus of claim 11 further comprising an inflatable vehicle occupant protection device for helping to protect the driver of the vehicle in a vehicle collision, said inflatable vehicle occupant protection device being attached to said steering wheel.

* * * * *